(12) United States Patent  
Schlote

(10) Patent No.: US 7,708,522 B2  
(45) Date of Patent: May 4, 2010

(54) ROTARY HEAT ENGINE

(75) Inventor: Andrew Schlote, Fenton, MO (US)

(73) Assignee: Innovative Energy, Inc., St. Charles, MO (US)

( * ) Notice: Subject to any disclaimer, the term of this patent is extended or adjusted under 35 U.S.C. 154(b) by 1066 days.

(21) Appl. No.: 11/324,604

(22) Filed: Jan. 3, 2006

(65) Prior Publication Data

US 2007/0151226 A1    Jul. 5, 2007

(51) Int. Cl.
*F01D 1/18* (2006.01)

(52) U.S. Cl. .............. 416/1; 415/1; 415/80; 415/181; 60/39.34; 60/39.35; 239/127.1; 239/127.3

(58) Field of Classification Search ............ 415/1, 415/80–82, 181; 416/1, 20 R, 20 A, 21, 22; 60/39.34, 39.35; 239/127.1, 127.2
See application file for complete search history.

(56) References Cited

U.S. PATENT DOCUMENTS

| | | | |
|---|---|---|---|
| 726,315 | A | 4/1903 | Lindmark |
| 834,371 | A | 10/1906 | Duc, Jr. |
| 1,003,708 | A | 9/1911 | Coleman |
| 1,210,831 | A | 1/1917 | Pfeiffer |
| 1,887,001 | A | 11/1932 | Zetterberg |
| 1,945,608 | A | 2/1934 | Hill |
| 2,188,128 | A | 1/1940 | Armstrong |
| 2,465,856 | A | 3/1949 | Emigh |
| 2,474,685 | A | 6/1949 | McCollum |
| 2,499,863 | A | 3/1950 | Hart |
| 2,536,599 | A | 1/1951 | Goddard |
| 2,536,600 | A | 1/1951 | Goddard |
| 2,544,420 | A | 3/1951 | Goddard |
| 2,603,947 | A | 7/1952 | Howard |
| 2,612,750 | A | 10/1952 | Goddard |
| 2,628,473 | A | 2/1953 | Frye |
| 2,637,166 | A | 5/1953 | Carswell |
| 2,702,601 | A * | 2/1955 | Nagler ................ 416/20 R |
| 3,032,988 | A | 5/1962 | Kleckner |
| 3,177,660 | A | 4/1965 | Haller |
| 3,825,364 | A | 7/1974 | Halila et al. |
| 4,304,095 | A | 12/1981 | Rasanen |
| 4,332,520 | A * | 6/1982 | House ................... 415/80 |
| 4,336,039 | A | 6/1982 | Sohre |

(Continued)

OTHER PUBLICATIONS

International Search Report for PCT/US02/26369, dated Feb. 27, 2003.*

(Continued)

*Primary Examiner*—Christopher Verdier
(74) *Attorney, Agent, or Firm*—Thompson Coburn LLP

(57) ABSTRACT

A rotor of a supersonic rotary heat engine comprises a rotor axis about which the rotor is adapted and configured to rotate, a plurality of thrust matter passageways, and a plurality of cooling passageways. Each of the thrust matter passageways is at least partially bound by a gas permeable wall. The outlet port of each thrust matter passageway is adapted and configured to discharge gaseous fluid into an exhaust environment external to the rotor in a manner creating a torque on the rotor about the rotor axis. Each of the cooling passageways is in fluid communication with a respective one of the thrust matter passageways via the gas permeable wall that at least partially bounds the respective thrust matter passageway.

20 Claims, 9 Drawing Sheets

U.S. PATENT DOCUMENTS

| | | | |
|---|---|---|---|
| 4,625,509 | A | 12/1986 | Sheppard, Sr. |
| 5,010,735 | A | 4/1991 | Assaf |
| 5,282,356 | A | 2/1994 | Abell |
| 5,408,824 | A | 4/1995 | Schlote |
| 5,544,961 | A | 8/1996 | Fuks et al. |
| 5,560,196 | A | 10/1996 | Schlote |
| 5,636,509 | A | 6/1997 | Abell |
| 5,709,076 | A | 1/1998 | Lawlor |
| 6,668,539 | B2 | 12/2003 | Schlote |
| 6,996,971 | B2 | 2/2006 | Schlote |

OTHER PUBLICATIONS

International Search Report for WO 03/016692 A3, dated Feb. 27, 2003.*
CN 02819114.6 dated Aug. 10, 2005 (abstract only).*
CN Application No. 1653252 dated Aug. 20, 2002 (abstract only).*
US 6,233,918, May 2001, Lawlor (withdrawn).

* cited by examiner

ROTARY HEAT ENGINE

FIELD OF THE INVENTION

The present invention pertains to rotary heat engines. More particularly, the present invention pertains to a rotor of rotary heat engine that discharge gaseous thrust matter at supersonic velocities.

BACKGROUND OF THE INVENTION

Producing motive power through the reactive force of jets has long been known. For instance, Goddard U.S. Pat. No. 2,637,166 discloses a turbine in which the reactions of high velocity jets are used to effect rotation of a turbine. Howard U.S. Pat. No. 2,603,947 discloses a ram jet arrangement for rotation in a continuous combustion-type generator. Goddard U.S. Pat. No. 2,544,420 discloses a combustion chamber used to provide rotational power in a propulsion apparatus such as in driving a propeller shaft. Hart U.S. Pat. No. 2,499,863 discloses a rotary jet propelled motor.

More recently, the inventor hereof has made developments in the field of rotary heat engines for which he has received U.S. Pat. Nos. 5,408,824, issued Apr. 25, 1995, 5,560,196, issued Oct. 1, 1996, and 6,668,539, issued Dec. 30, 2003, the disclosures of which are hereby incorporated by reference.

SUMMARY OF THE INVENTION

The present invention is directed to a supersonic rotary heat engine having a rotor that passes gaseous cooling matter through a bounding wall of a thrust discharge passageway to maintain the wall at a lower temperature than it would otherwise experience. In one aspect of the invention, a rotor of a rotary heat engine comprises a rotor axis about which the rotor is adapted and configured to rotate, a plurality of thrust matter passageways, and a plurality of cooling passageways. Each of the thrust matter passageways comprises a converging region, a diverging region, and an outlet port. Additionally, each of the thrust matter passageways is at least partially bound by a gas permeable wall. The outlet port of each thrust matter passageway is adapted and configured to discharge gaseous fluid into an exhaust environment external to the rotor in a manner creating a torque on the rotor about the rotor axis. The diverging region of each of the thrust matter passageways is between the outlet port and the converging region of the respective thrust matter passageway. Each of the cooling passageways is in fluid communication with a respective one of the thrust matter passageways via the gas permeable wall that at least partially bounds the respective thrust matter passageway.

In another aspect of the invention, a method comprises a step of providing a rotor. The rotor comprises an axis, a plurality of thrust matter passageways, plurality of cooling passageways, and at least one gas permeably wall separating at least one of the thrust matter passageways from at least one of the plurality of cooling passageways. The method further comprises a step of passing gaseous thrust matter through the thrust matter passageways of the rotor in a manner such that the gaseous thrust matter is discharged from the rotor at a supersonic velocity relative to the rotor and such that the discharge creates a torque on the rotor about the axis. The gaseous thrust matter has an average static temperature within the rotor. The method yet further comprises a step of passing gaseous cooling matter along the cooling passageways of the rotor in a manner such that at least some of the gaseous cooling matter passes through the at least one gas permeable wall of the rotor and into at least one of the thrust matter passageways. The gaseous cooling matter has an average static temperature within the cooling passageways that is below the static temperature of the gaseous thrust matter.

While the principal advantages and features of the invention have been described above, a more complete and thorough understanding of the invention may be obtained by referring to the drawings and the detailed description of the preferred embodiment, which follow.

Figure 1:
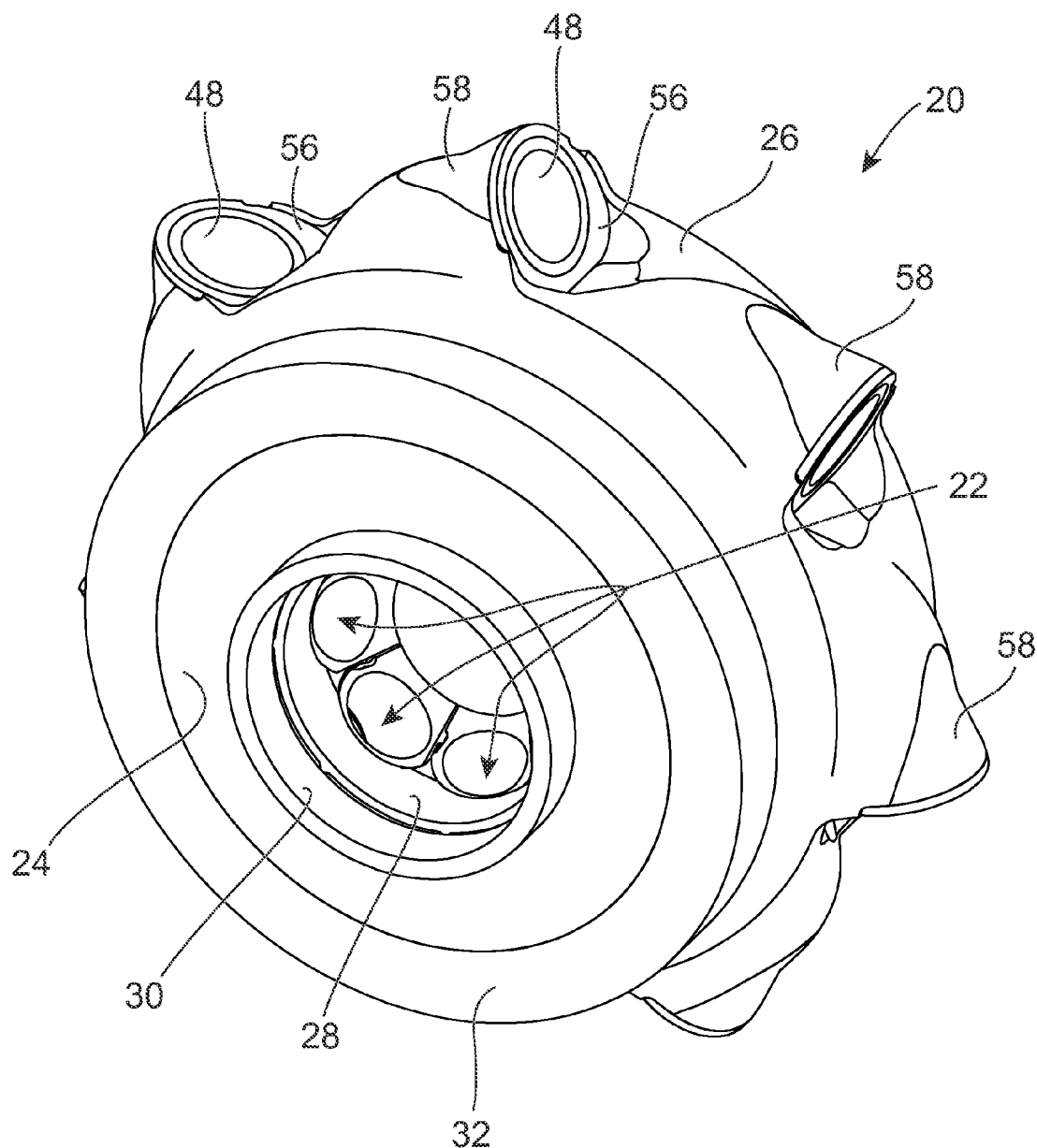
FIG. 1 is a perspective view of the preferred embodiment of a rotor of a rotary heat engine in accordance with the invention, showing the front, top, and right side thereof.
Figure 2:
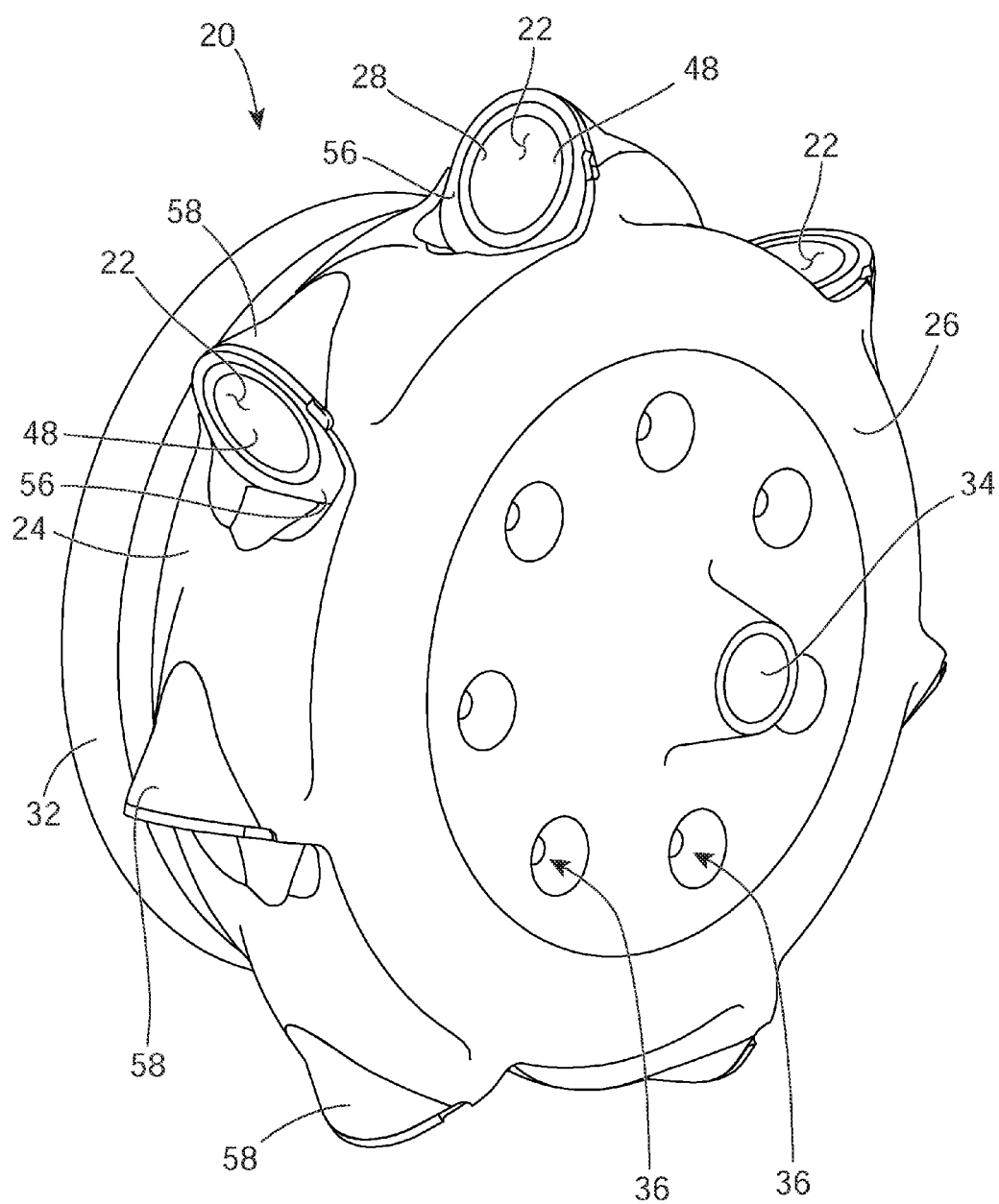
FIG. 2 is a perspective view of the rotor shown in FIG. 1, showing the rear, top, and right side thereof.
Figure 3:
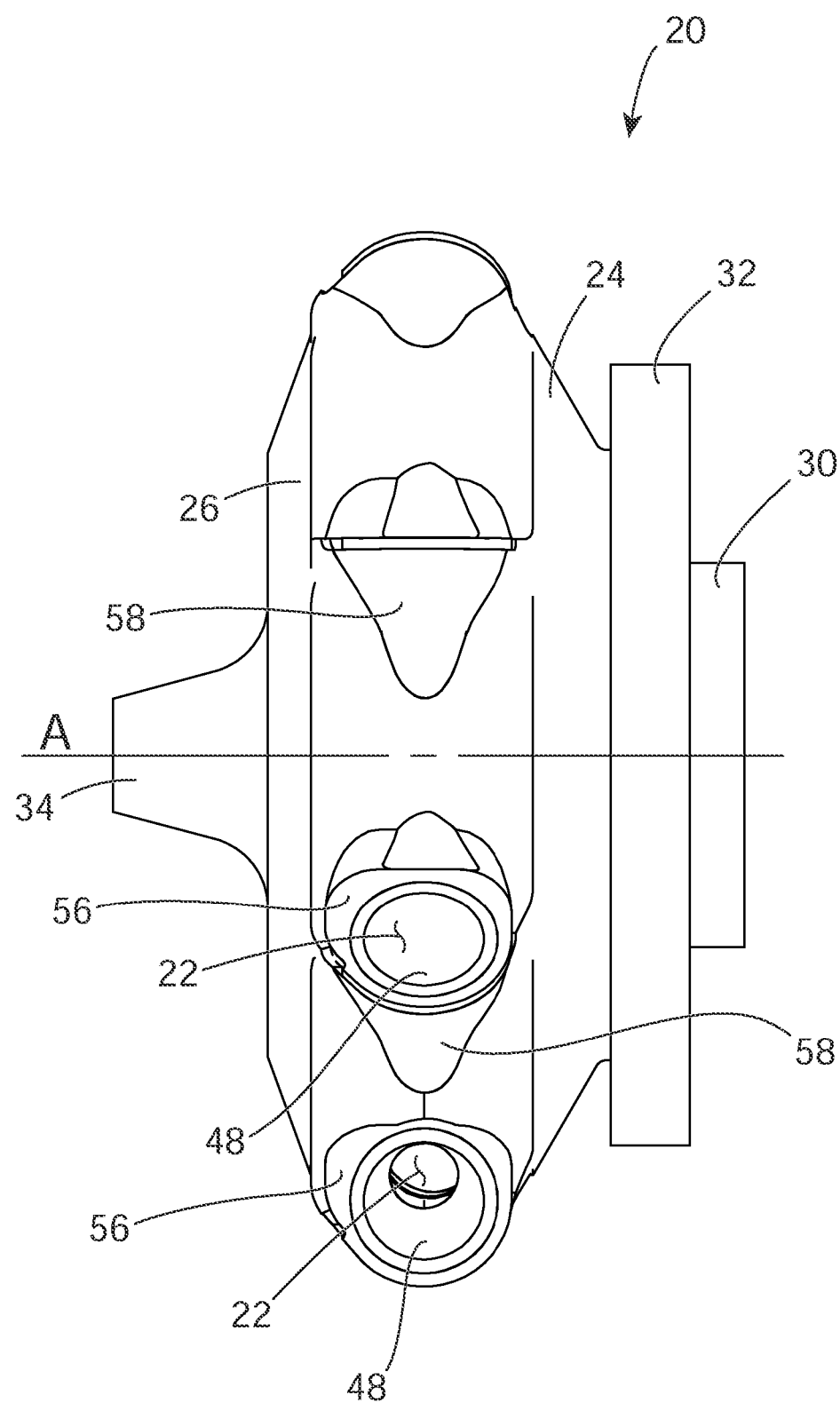
FIG. 3 is a top plan view of the rotor shown in FIGS. 1 and 2.
Figure 4:
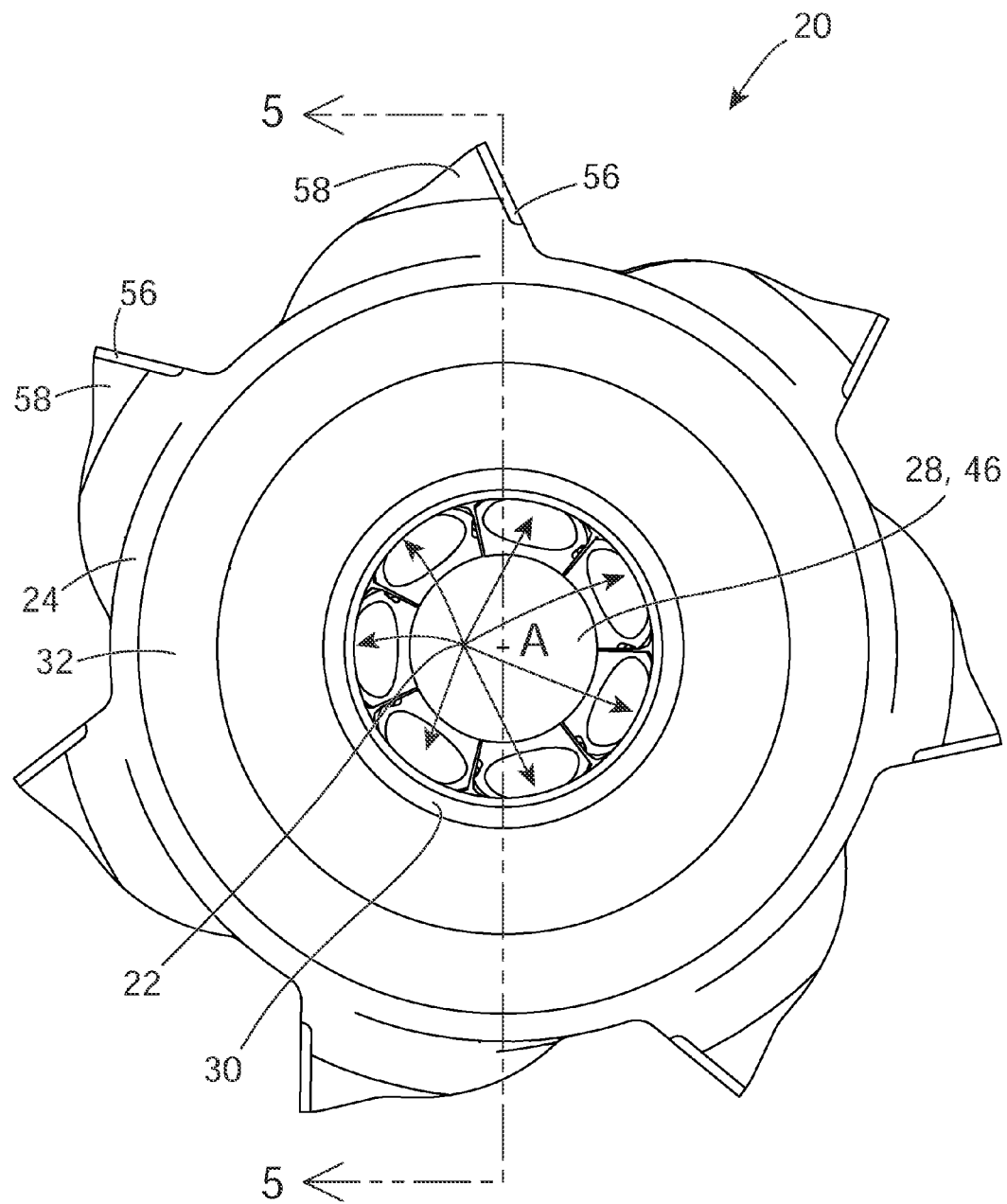
FIG. 4 is a front elevation view of the rotor shown in FIGS. 1-3.

Reference characters in the written specification indicate corresponding items shown throughout the drawing figures.

DETAILED DESCRIPTION OF THE PREFERRED EMBODIMENT OF THE INVENTION

The preferred embodiment of a rotor 20 in accordance with the invention is shown in its entirety in FIGS. 1-5. The rotor 20 is configured and adapted to expel high velocity gaseous thrust matter from a plurality of thrust matter passageways 22 in a manner creating a torque that rotationally drives the rotor about axis A.

The rotor 20 preferably comprises front 24 and rear 26 main body portions, a tube assembly 28, a seal ring 30, and a hoop tension ring 32. The front 24 and rear 26 main body portions are preferably machined out of solid 10-2-3 titanium. The front 24 and rear 26 main body portions constitute a majority of the mass of the rotor 20 and support the tube assembly 28. The rear main body portion 26 comprises a shaft fitting 34 that is aligned with the rotor axis, a plurality of through-holes 36 arranged circumferentially about the rotor axis, and circular socket 38 that is aligned with the rotor axis opposite the shaft fitting. A plurality of grooves or channels are also formed in the rear main body portion 26 that, together with grooves or channels in the front main body portion 24, form fluid passageways and provide space for the tube assembly 28. The front main body portion 24 comprises a plurality of threaded blind-holes 40 arranged circumferentially about the rotor axis and a circular protrusion 42 that is aligned with the rotor axis. The front 24 and rear 26 main body portions are secured to each other with the circular protrusion 42 of the front main body portion positioned in the socket 38 of the rear main body portion. Bolts (not shown) also extend through the through-holes 36 of the rear main body portion 26 and are threadably engaged with the threaded blind-holes 40 of the front main body portion 24. The front 24 and rear 26 main body portions are also welded to each other around their perimeters.

The tube assembly 28 preferably comprises seven identical branches 44 and an inlet plenum 46. The various components of the tube assembly 28 are gas permeable. Preferably, each component of the tube assembly 28 is formed out of sintered 6-2-4-2 titanium and has a sintered density of approximately eighty percent. Each branch 44 is generally tubular and preferably comprises a nozzle 48, an elbow 50, and a straight section 52 that, along with the inlet plenum 46, form one of the thrust matter passageways 22 of the rotor 20. Because each component of the tube assembly 28 is gas permeable, it should be appreciated that each thrust matter passageway 22 is entirely bound by gas permeable walls. The nozzle 48 and elbow 50 are preferably formed together as a single piece, while the straight section 52 and the inlet plenum 46 are separate pieces. The nozzle 48 of each branch 44 is configured such that the portion of the thrust matter passageway 22 within the nozzle reduces in cross-sectional area and then increases downstream therefrom. Thus, the nozzle 48 is a converging-diverging nozzle adapted to cause compressible flow to accelerate from a subsonic velocity to a supersonic velocity as it passes therethrough. The porosity of the wall of the diverging region of nozzle 4S is preferably made less than the porosity of the remainder of each respective branch 44 via any of various standard means known in the art. The exterior of the nozzle 48 preferably comprises a plurality of generally annular rib protrusions 54 with voids therebetween. Similarly, the exterior of the elbow 50 comprises rib protrusions 54 that partially circumscribe the thrust matter passageway 22. The elbow 50 preferably turns the direction of the thrust matter passageway 22 approximately ninety degrees, and more preferably 87.5 degrees. The straight section 52 joins the upstream end of the elbow 50 to the inlet plenum 46. The straight section 52 and the elbow 50 preferably connect to each other via a socket fitting. The exterior of the straight section 52 preferably comprises a plurality of rib protrusions 54 that extend linearly. The inlet plenum 46 is cup-shaped with a plurality of openings for the branches 44 of the tube assembly 28. The exterior of the inlet plenum 46 also preferably comprises rib protrusions 54 that are parallel to each other and that are spaced circumferentially around the inlet plenum. The exterior of the closed rear end of the inlet plenum 46 preferably comprises a ring shaped rib protrusion 54.

Figure 5:
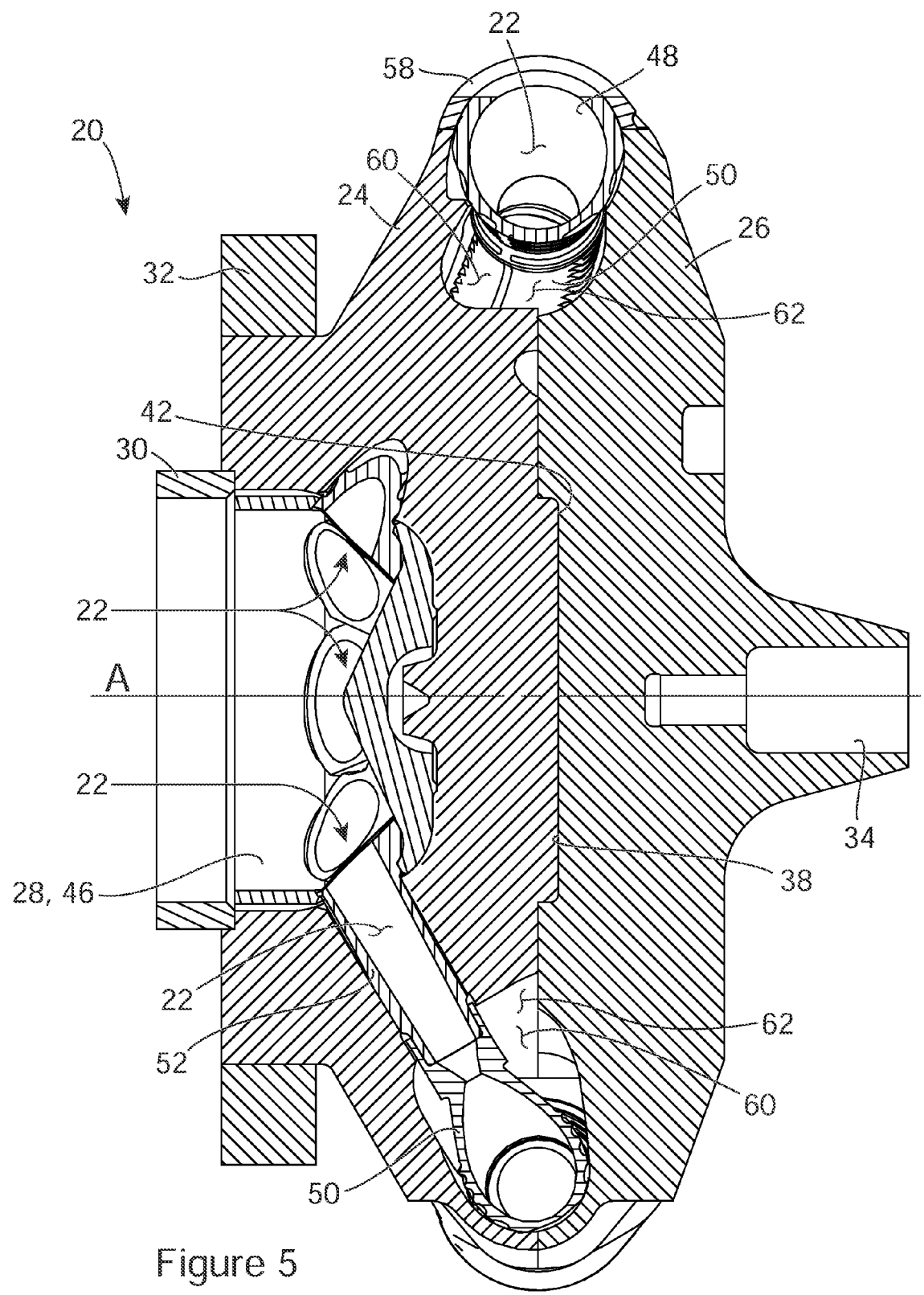
FIG. 5 is a cross-sectional view of the rotor shown in FIGS. 1-4, taken about the line 5-5 shown in FIG. 4.
Figure 6:
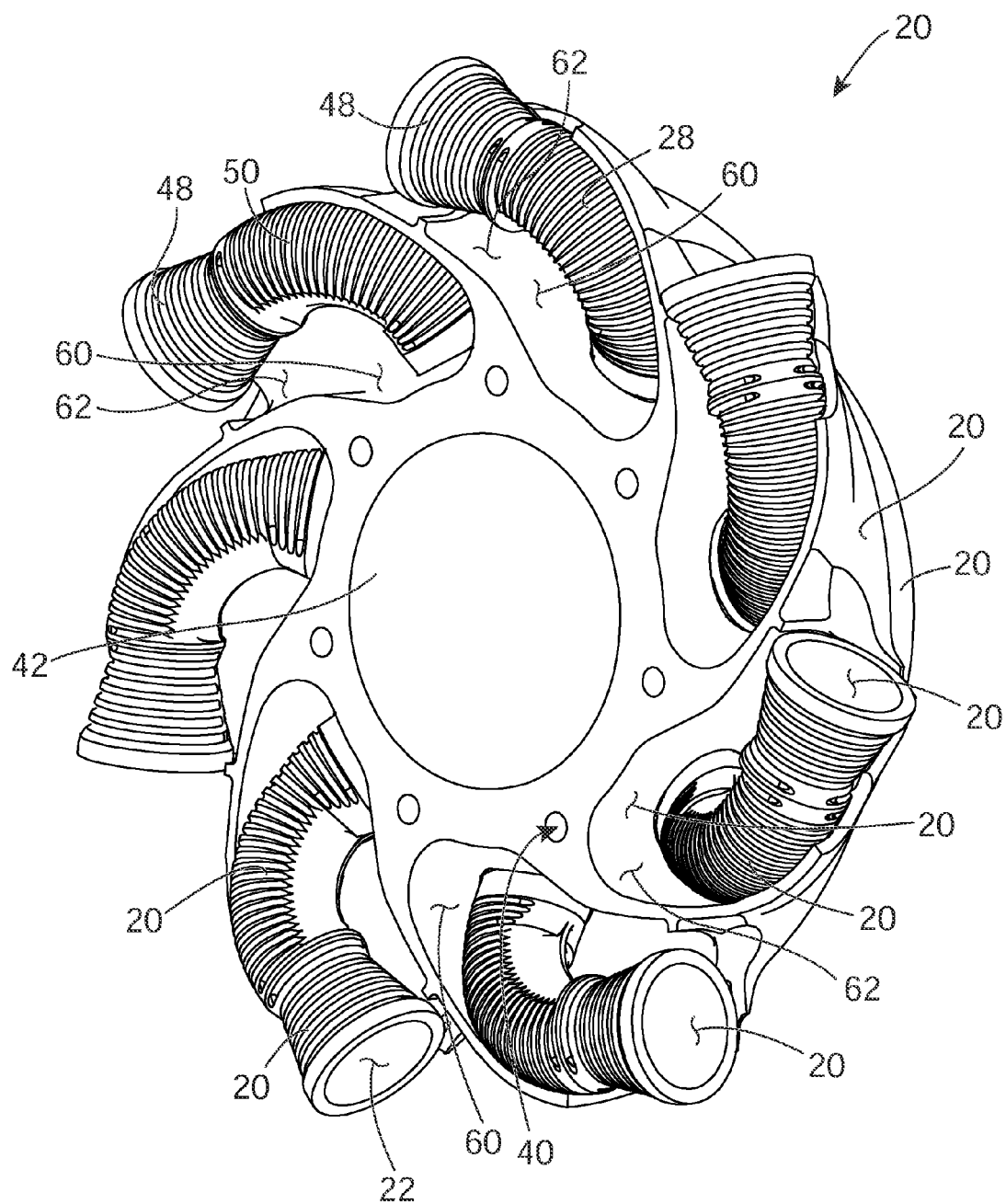
FIG. 6 is perspective view of the rotor shown in FIGS. 1-5, showing the rear, top, and left side thereof with the rear main body portion removed to reveal details of the interior of the rotor.
Figure 7:
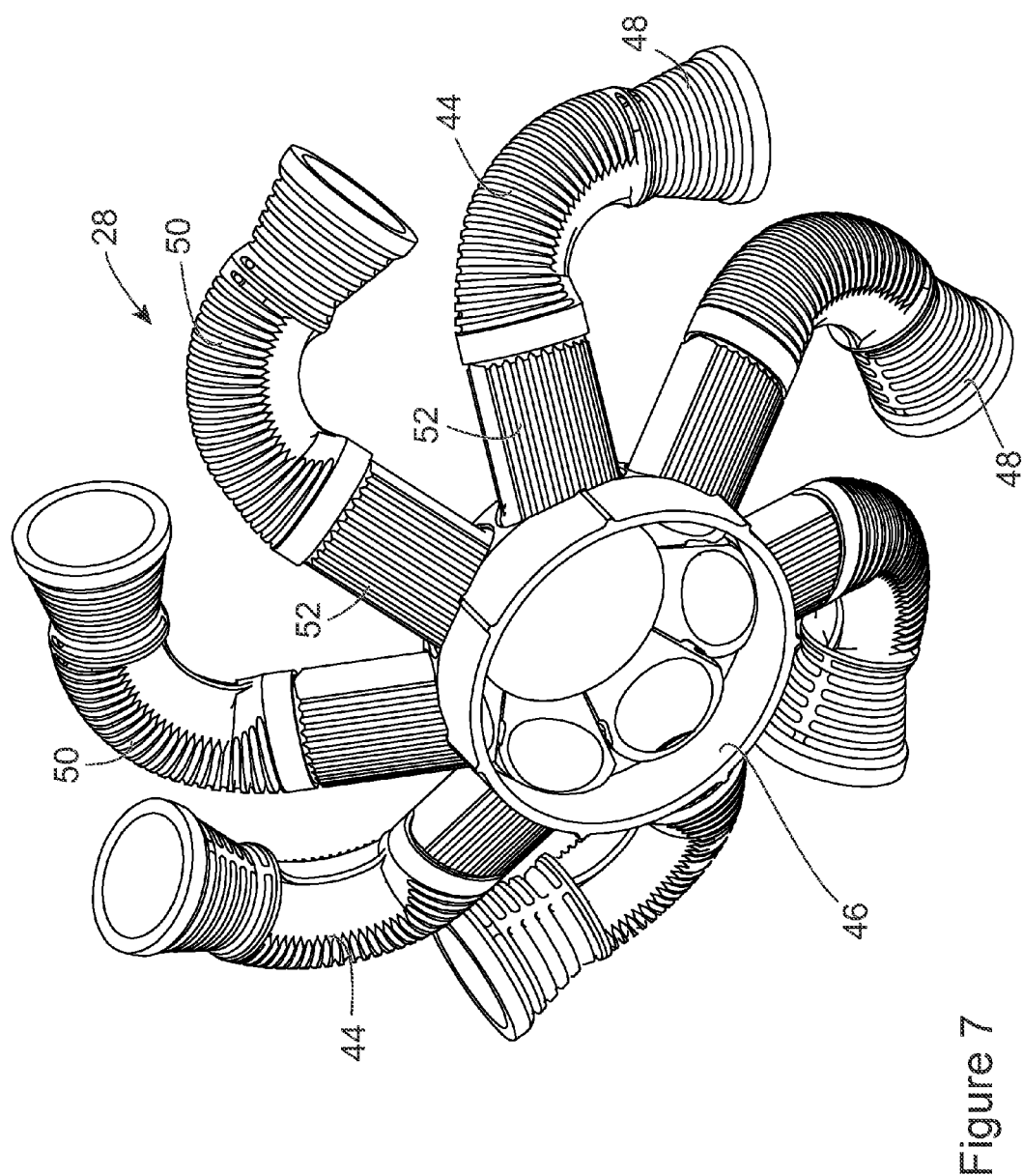
FIG. 7 is perspective view of the assembly of permeable tubes and the inlet plenum of the rotor shown in FIGS. 1-6.
Figure 8:
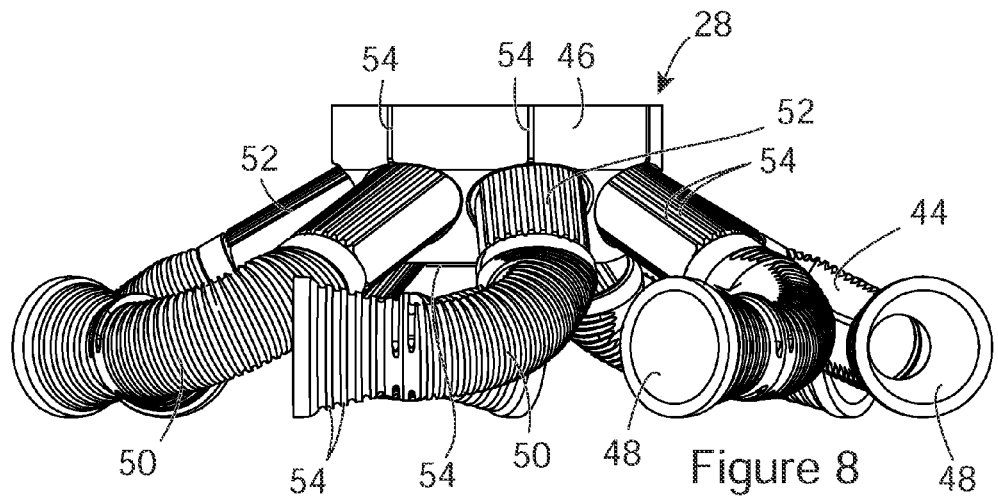
FIG. 8 is a top plan view of the tube assembly shown in FIG. 7.
Figure 9:
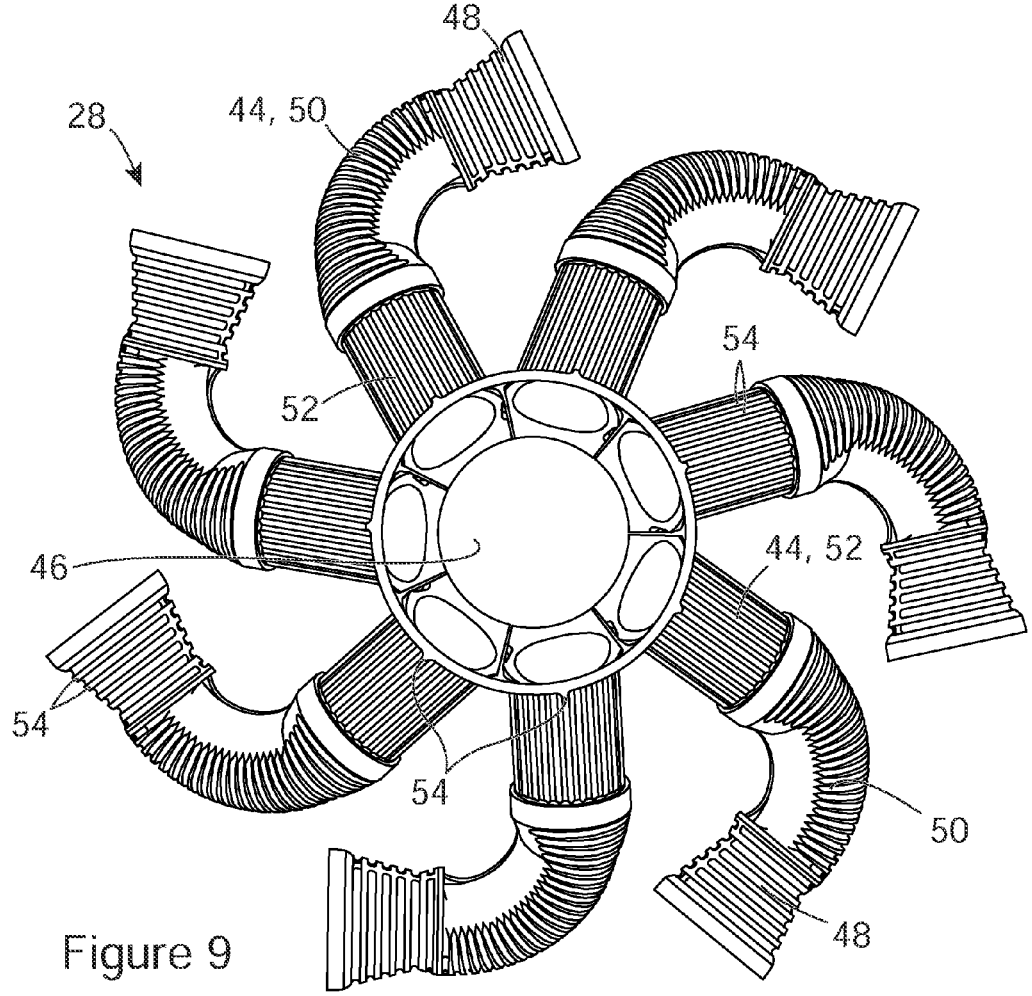
FIG. 9 is a front elevation view of the tube assembly shown in FIGS. 7 and 8.
Figure 10:
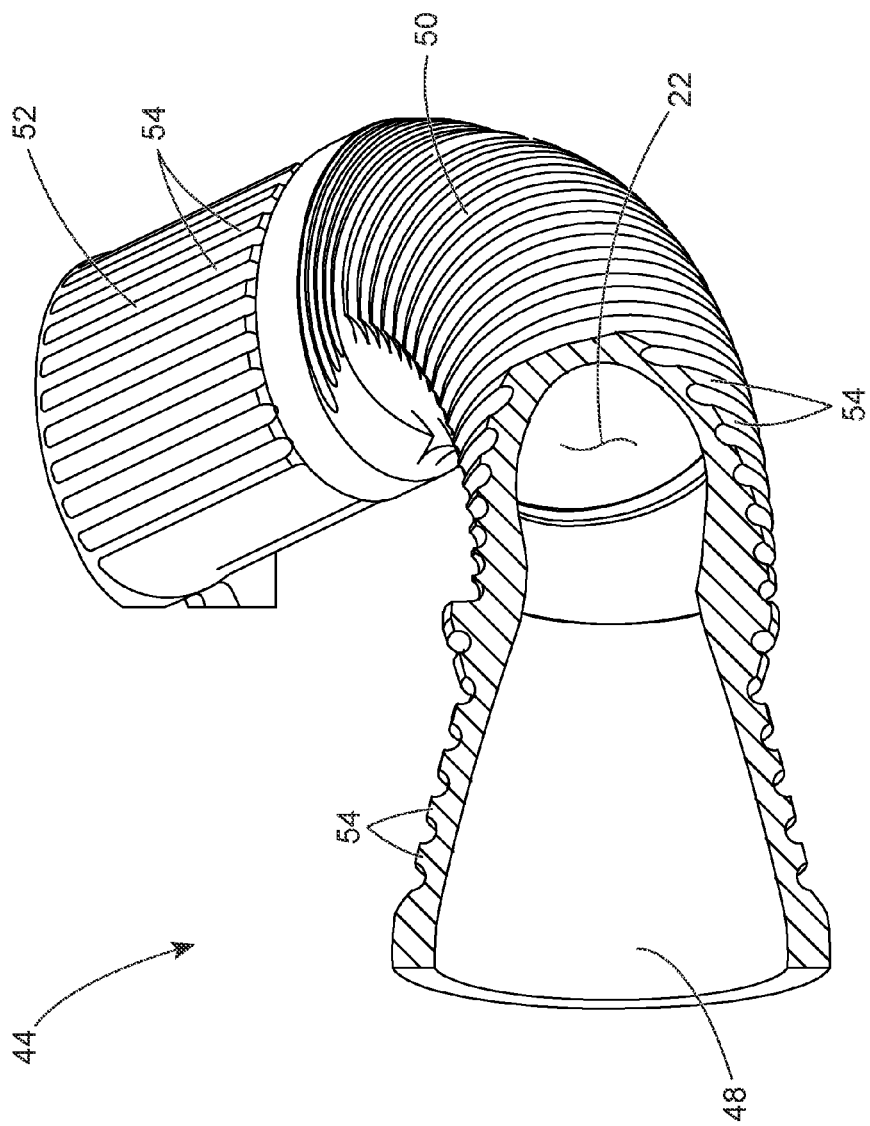
FIG. 10 is a perspective view of a branch of the tube assembly of the rotor shown in FIGS. 1-6, and is shown with a break-out detail to reveal the interior of the nozzle of the branch of the tube assembly.

The seal ring 30 is preferably formed out of solid 10-2-3 titanium and is attached to the front main body portion 24 in a manner such that the seal ring encircles and lies in front of the open end of the inlet plenum 46. As can be seen in FIGS. 1 and 5, the rear of the inner surface of the seal ring 30 is preferably chamfered so as to create a fluid passageway that extends through the seal ring and between the inlet plenum 46 and the surrounding wall of the front main body portion 24 of the rotor 20.

The hoop tension ring 32 is preferably formed out of a carbon fiber composite material and encircles the front main body portion 24 of the rotor 20. The hoop tension ring 32 is configured and adapted to radially expand less, as result of any particular rotational velocity, than would the front main body portion 24 of the rotor 20 without the hoop tension ring at the same rotational velocity. Thus the hoop tension ring 32 is configured and adapted to counteract some of the radial tensile stresses that, but for its presence, would exist in the front main body portion 24 of the rotor 20 during rotor rotation.

The rotor 20 also preferably comprises a nozzle plate 56 and nozzle shroud 58 for each of its nozzles 48. Each of the nozzle plates 56 and nozzle shrouds 58 is preferably formed of sintered 6-2-4-2 titanium and has a sintered density of approximately eighty percent, thereby making each nozzle plate and each nozzle shroud gas permeable. Each nozzle plate 56 surrounds the thrust matter outlet port of a respective nozzle 48 and is preferably welded thereto and to the front 24 and rear 26 main body portions of the rotor 20. Each nozzle shroud 58 preferably wraps over the radially outermost portion of the respective nozzle plate 56 and covers the radially outermost end margin of the respective nozzle 48. Each nozzle shroud 58 is preferably welded to the respective nozzle plate 56 and to the front 24 and rear 26 main body portions of the rotor 20.

Assembled as described above, the rotor 20 comprises a plurality of thrust matter passageways 22 that each extend into the rotor through the seal ring 30 and into the inlet plenum 46, and thereafter branch apart into the plurality of tubular branches 44 of the rotor, eventually exiting the rotor through the nozzles 48. The various components of the tube assembly 28 of the rotor 20 are supported by their rib protrusions 54, which the front 24 and rear 26 main body portions of the rotor substantially surround and engage. A plurality of cooling passageways 60 also extend through the rotor 20. Each cooling passageway 60 extends through the seal ring 30 and then into voids between the rib protrusions 54 of the inlet plenum 46, radially between the inlet plenum and the front main body portion 24 of the rotor 20 by passing through the annular gap between the seal ring and the front most edge of the inlet plenum. The cooling passageways 60 thereafter branch apart with each traveling in the voids between the rib protrusions 54 of a respective straight section 52 of a branch 44 of the tube assembly 28. The cooling passageways 60 thereafter enter a cavity 62 that extends partially around the respective elbow 50 and nozzle 48 of the branch 44 of the tube assembly 28 and between the voids in the rib protrusions thereof. Gaseous cooling matter can exit the cooling passageways 60 by passing through the permeable material of the tube assembly 28 and into the exhaust matter passageways 22, or by passing through the permeable material of the nozzle plates 56 and the nozzle shrouds 58 directly into the exhaust environment that radially surrounds the rotor 20.

Thus, at least some of the gaseous cooling matter exits the rotor without passing into the thrust matter passageways. At least a portion of each thrust matter passageway is formed by a tubular member and each of the cooling passageways extends between the rib protrusions of at least one of the tubular members, respectively.

In operation, pressurized gaseous thrust matter and gaseous cooling matter is forced into the rotor 20 through the seal ring 30 at the front of the rotor. This is preferably achieved via two stationary cylindrical tubes (not shown) that are oriented circumjacent each other and spaced from each other, with the gaseous thrust matter passing through the innermost tube and with the gaseous cooling matter passing through the space radially between the tubes. The outer stationary tube preferably has an outer diameter that is just slightly smaller than the inner diameter of the seal ring 30 and preferably stops short the chamfer of the seal ring. The inner stationary tube preferably has an outer diameter that is just slightly smaller than the inner diameter of the inlet plenum 46 and preferably extends slightly thereinto. As such, the gaseous thrust matter and the gaseous cooling matter are generally channeled into the thrust matter passageways 22 and the cooling passageways 60, respectively. The gaseous thrust matter passing through the rotor 20 preferably has a static pressure of approximately 45 psia, but travels through the rotor at a velocity such that its total pressure exceeds 50 psia. Preferably the total pressure is approximately 60 psia. The gaseous cooling matter passing through the rotor 20 preferably has a total pressure of approximately 55 psia when in the cooling passageways 60, with static pressure at most only a few psi less, and has a static temperature below that of the gaseous thrust matter. As a result of the differences in static pressures of the flows, some of the gaseous cooling matter passes through the permeable walls of the tube assembly 28 from the cooling passageways 60 and into the thrust matter passageways 22. Additionally, some of the gaseous cooling matter passes through the permeable nozzle plates 56 and nozzle shrouds 58 from the cooling passageways 60 and into the exhaust environment. Thus, each of the cooling passageways is in direct fluid communication with the exhaust environment through at least one gas permeable wall. The gaseous cooling matter passing through the cooling passageways 60 of the rotor 20 maintains the tube assembly 28 at temperatures acceptably below the temperature of the gaseous thrust matter and prevents the front 24 and rear 26 main body portions of the rotor 20 from reaching temperatures that would compromise their strength.

The gaseous thrust matter passing through the rotor 20 is accelerated to supersonic speeds via the nozzles 48 of the tube assembly 28 and preferably exits the nozzles into the exhaust environment at a Mach Number between 2.0 and 4.0, and more preferably between 2.7 and 3.2 relative to the rotor. It should be appreciated that the reduced porosity of the diverging region of each of the nozzles 48 as compared to that of the remainder of the respective branch 44 of the tube assembly 28 limits the flow of cooling matter passing through the wall of the diverging region of the nozzle into the thrust matter passageway 22 so as to prevent such flow from adversely affecting the boundary layer of the thrust matter flow within the diverging region of the nozzle. The rotor is preferably supported by and fixed to a rotatable shaft (not shown) via the shaft fitting 34 of its rear main body portion 26. The resulting torque generated by the discharge of the gaseous thrust matter from the rotor 20 rotationally drives the rotor, preferably at a rate of 40,000 to 60,000 RPM. The torque is then transferred via the shaft to an electric generator or other energy converter where it is converted to useful energy.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, the term "portion" should be construed as meaning some or all of the item or element that it qualifies.

What is claimed is:

1. A rotor of a rotary heat engine comprising:
   a rotor axis about which the rotor is adapted and configured to rotate;
   a plurality of thrust mailer passageways, each of the thrust matter passageways comprising a converging region, a diverging region, and an outlet port, each of the thrust matter passageways being at least partially bound by a gas permeable wall, the outlet port of each thrust mailer passageway being adapted and configured to discharge gaseous fluid into an exhaust environment external to the rotor in a manner creating a torque on the rotor about the rotor axis, the diverging region of each of the thrust matter passageways being between the outlet port and the converging region of the respective thrust matter passageway; and
   a plurality of cooling passageways, each respective one of the cooling passageways being in fluid communication with a respective one of the thrust matter passageways via the respective gas permeable wall that at least partially bounds the respective thrust matter passageway.

2. A rotor in accordance with claim 1 wherein the rotor further comprises gaseous fluid in each of the thrust matter passageways and each of the cooling passageways, the gaseous fluid in the thrust matter passageways having a minimum total pressure, the gaseous fluid in the cooling passageways having a maximum total pressure, the minimum total pressure being greater than the maximum total pressure.

3. A rotor in accordance with claim 2 wherein the gaseous fluid in the thrust matter passageways has a maximum static temperature, the gaseous fluid in the cooling passageways has a maximum static temperature, and the maximum static temperature of the gaseous fluid in the thrust matter passageways is greater than the maximum static temperature of the gaseous fluid in the cooling passageways.

4. A rotor in accordance with claim 1 wherein the rotor further comprises an inlet plenum that is in fluid communication with an intake environment external to the rotor and that forms an undivided upstream portion of each of the thrust matter passageways.

5. A rotor in accordance with claim 1 wherein each of the gas permeable walls is formed of sintered metal.

6. A rotor in accordance with claim 1 wherein each of the gas permeable walls is tubular and comprises a plurality of ribs that project outwardly in a manner such that voids exist between the ribs, and the cooling passageways have a combined volume that includes the voids between the ribs of each of the gas permeable walls.

7. A rotor in accordance with claim 1 wherein each of the thrust matter passageways is entirely bound by gas permeable walls.

8. A rotor in accordance with claim 1 wherein each of the cooling passageways is in direct fluid communication with the exhaust environment through at least one gas permeable wall.

9. A method comprising:
   providing a rotor, the rotor comprising an axis, a plurality of thrust matter passageways, a plurality of cooling passageways, and at least one gas permeable wall separating at least one of the thrust matter passageways from at least one of the plurality of cooling passageways;
   passing gaseous thrust matter through the thrust matter passageways of the rotor in a manner such that the gaseous thrust matter is discharged from the rotor at a supersonic velocity relative to the rotor and such that the discharge creates a torque on the rotor about the axis, the gaseous thrust matter having an average static temperature within the rotor;

passing gaseous cooling matter along the cooling passageways of the rotor in a manner such that at least some of the gaseous cooling matter passes through the at least one gas permeable wall of the rotor and into at least one of the thrust matter passageways, the gaseous cooling matter having an average static temperature within the cooling passageways that is below the static temperature of the gaseous thrust matter.

10. A method in accordance with claim 9 wherein the step of passing the gaseous thrust matter through the gaseous thrust matter passageways of the rotor comprises passing all of the gaseous thrust matter into the rotor through a first inlet.

11. A method in accordance with claim 10 wherein the step of passing the gaseous cooling matter along the cooling passageways of the rotor comprises passing all of the gaseous cooling matter into the rotor through a second inlet.

12. A method in accordance with claim 9 wherein the step of passing the gaseous cooling matter along the cooling passageways of the rotor further occurs in a manner such that at least some of the gaseous cooling matter exits the rotor without passing into the thrust matter passageways.

13. A method in accordance with claim 9 wherein the step of providing the rotor occurs in a manner such that at least a portion of each thrust matter passageway is formed by a tubular member that is gas permeable and that has a plurality of rib protrusions formed on its exterior, and such that the gas permeable walls are portions of the tubular members and each of the cooling passageways extends between the rib protrusions of at least one of the tubular members respectively.

14. A method in accordance with claim 9 wherein the step of providing the rotor comprises sintering pieces of material to each other to form the gas permeable walls.

15. A method in accordance with claim 9 wherein the step of passing the gaseous thrust matter through the thrust matter passageways of the rotor occurs in a manner such that the rotor revolves about the axis at a rate ranging from 40,000 RPM to 60,000 RPM relative to the earth.

16. A method in accordance with claim 9 wherein the step of passing the gaseous thrust matter through the thrust matter passageways of the rotor occurs in a manner such that the gaseous thrust matter has an average total pressure within the rotor, and wherein step of passing the gaseous cooling matter along the cooling passageways of the rotor occurs in a manner such that the gaseous cooling matter has an average total pressure within the cooling passageways that is less than the average total pressure of the gaseous thrust matter.

17. A method in accordance with claim 16 wherein the step of passing the gaseous thrust matter through the thrust matter passageways of the rotor occurs in a manner such that the total pressure of the gaseous thrust matter exceeds 50 psia.

18. A method in accordance with claim 9 wherein the step of passing the gaseous thrust matter through the thrust matter passageways of the rotor occurs in a manner such the supersonic velocity has a Mach Number within a range of 2.0 to 4.0.

19. A method in accordance with claim 18 wherein the step of passing the gaseous thrust matter through the thrust matter passageways of the rotor occurs in a manner such the supersonic velocity has a Mach Number within a range of 2.7 to 3.2.

20. A method in accordance with claim 9 wherein the step of passing the gaseous thrust matter through the thrust matter passageways of the rotor occurs in a manner such that the gaseous thrust matter has mass flow rate through the rotor, and wherein step of passing the gaseous cooling matter along the cooling passageways of the rotor occurs in a manner such that the gaseous cooling matter has mass flow rate through the rotor that is less than five percent of the mass flow rate of the gaseous thrust matter.

\* \* \* \* \*